United States Patent [19]

Smith, III

[11] Patent Number: 5,029,613

[45] Date of Patent: Jul. 9, 1991

[54] HYDRAULIC COUPLER WITH RADIAL METAL SEAL

[75] Inventor: Robert E. Smith, III, Stafford, Tex.

[73] Assignee: National Coupling Company, Inc., Stafford, Tex.

[21] Appl. No.: 589,767

[22] Filed: Sep. 28, 1990

[51] Int. Cl.⁵ .............................................. F16L 29/00
[52] U.S. Cl. ................................. 137/614.04; 285/110
[58] Field of Search .......................... 137/614, 614.04; 285/108, 109, 110

[56] References Cited

U.S. PATENT DOCUMENTS

| Re. 18,296 | 12/1931 | Pierce. | |
|---|---|---|---|
| 1,913,982 | 6/1933 | Fox. | |
| 2,218,318 | 10/1940 | Pfauser | 284/19 |
| 2,265,267 | 12/1941 | Cowles | 284/19 |
| 2,730,380 | 1/1956 | Espy et al. | 284/19 |
| 2,976,066 | 3/1961 | Antoniades | 286/10 |
| 3,054,422 | 9/1962 | Napolitano | 137/509 |
| 3,142,498 | 7/1964 | Press | 285/12 |
| 3,163,431 | 12/1964 | Tanner | 277/206 |
| 3,201,151 | 8/1965 | Westveer | 285/73 |
| 3,205,911 | 9/1965 | Swick, Jr. | 137/614.03 |
| 3,447,819 | 6/1969 | Borsum et al. | 285/111 |
| 3,473,556 | 10/1969 | Johnson et al. | 137/322 |
| 3,498,324 | 3/1970 | Breuning | 137/614.04 |
| 3,508,580 | 4/1970 | Snyder, Jr. | 137/614.04 |
| 3,519,278 | 7/1970 | Fuhrmann | 277/153 |
| 3,625,251 | 12/1971 | Nelson | 137/614.01 |
| 3,891,246 | 6/1975 | Hopper | 285/110 |
| 3,918,485 | 11/1975 | Weber et al. | 137/594 |
| 4,324,407 | 4/1982 | Upham et al. | 277/27 |
| 4,453,566 | 6/1984 | Henderson, Jr. | 137/614.02 |
| 4,476,772 | 10/1984 | Gorman et al. | 92/168 |
| 4,556,196 | 12/1985 | Nimberger | 251/214 |
| 4,602,806 | 7/1986 | Saliger | 285/41 |
| 4,694,859 | 9/1987 | Smith | 137/614.04 |
| 4,709,726 | 12/1987 | Fitzgibbons | 137/614.04 |
| 4,768,538 | 9/1988 | Mintz et al. | 137/15 |
| 4,817,668 | 4/1989 | Smith | 137/614.04 |

*Primary Examiner*—John C. Fox
*Attorney, Agent, or Firm*—Arnold, White & Durkee

[57] ABSTRACT

A coupling having a seal member with an annular flexible metal seal surface for sealing with a male member or probe. The metal seal surface is integral with the seal member and extends into the bore of the female member. The metal seal surface is urged radially inwardly against the male member in response to internal fluid pressure in the coupling.

15 Claims, 1 Drawing Sheet

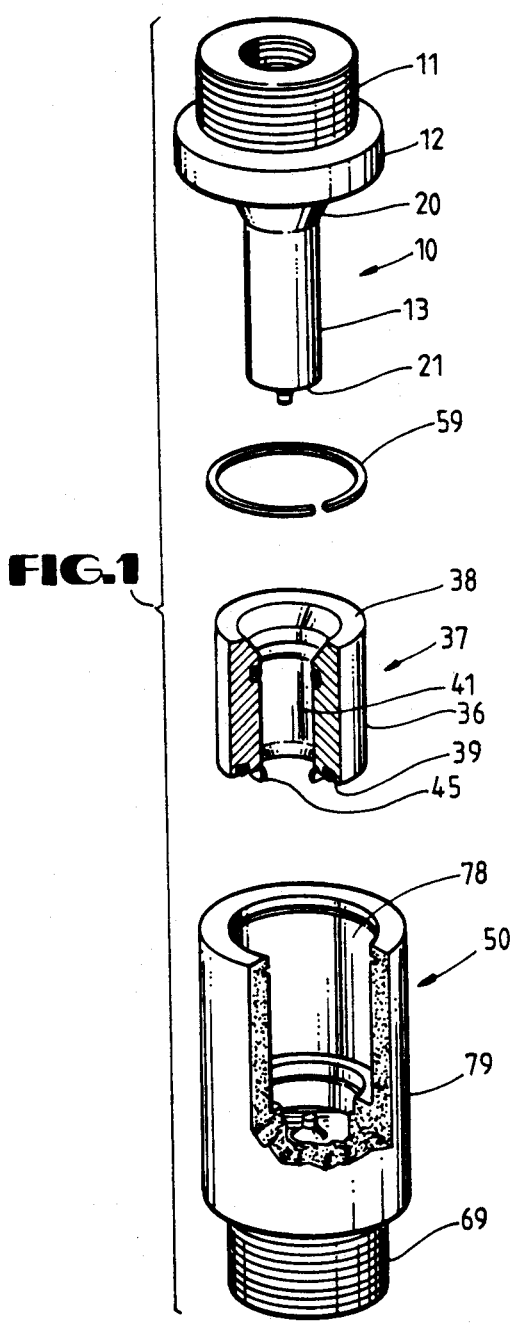
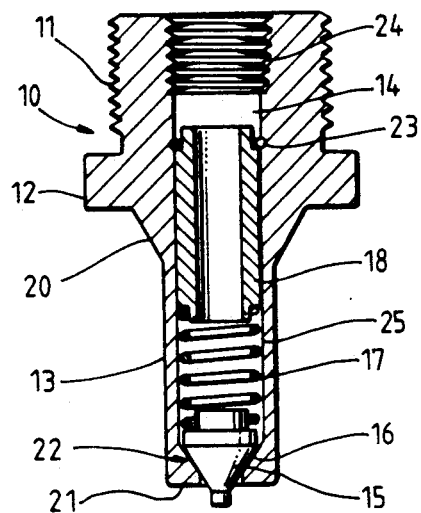
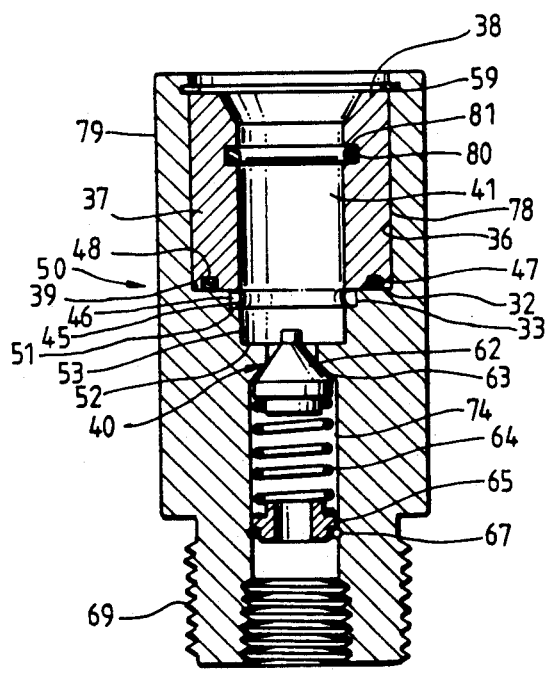

HYDRAULIC COUPLER WITH RADIAL METAL SEAL

BACKGROUND OF THE INVENTION

I. Field of the Invention

The present invention relates to hydraulic couplings used in undersea drilling and production applications and seals used in those couplings. More particularly, the invention involves a three-piece coupling with a radial metal seal for sealing the junction between the male and female members of the coupling.

II. Related Art

Subsea hydraulic couplings are old in the art. The couplings generally consist of a male and a female member with soft seals to seal the junction between male and female members.

The female member is generally a cylindrical body with a relatively large diameter longitudinal bore at one end and a relatively small diameter longitudinal bore at the other. The small bore facilitates connections to hydraulic lines, while the large bore contains the soft seals and receives the male portion of the coupling. The male member includes a cylindrical portion at one end to facilitate connection to hydraulic lines. When the cylindrical portion of the male member is inserted into the large bore of the female member, according to the various embodiments of the device, the soft seals, resembling O-rings, either abut the end, or face, of the male member or engage the male member about its circumference. The hydraulic fluid is then free to flow through the female and male portions of the couplings, and seals prevent that flow from escaping about the joint in the coupling.

In some instances, a check valve may be installed in the female member and also in the male member. Each check valve is open when the coupling is made up; however, each check valve closes when the coupling is broken, so as to prevent fluid from leaking out the system of which the coupling is a part.

The soft seals have numerous disadvantages, the principle ones being (1) the inability of the seal to withstand the deteriorating effects of the subsea environment for extended periods of time, and (2) the inability of the soft seal to contain the higher pressures being imposed on the hydraulic systems.

A metal seal is available which better withstands both the deteriorating effects of the environment and higher pressures. That seal is a crush type which is positioned between the end of the male portion of the coupling and the internal end of the large bore in the female portion. When the male portion is inserted into the female, the metal seal is crushed between the two portions and a seal is effectuated between the two. In view of the crushing action, the seal can be used only once. If the coupling is separated for any reason, the once crushed seal can be replaced with a new seal. An example of this type of coupling and seal is shown in U.S. Pat. No. 3,918,485.

Another type of hydraulic coupler with a metal seal is disclosed in U.S. Pat. No. 4,647,470. As may be seen, this design uses a V-shaped metal seal. The metal V-seal rests in the female member and is only effective when it is tightly compressed by pressure from the leading face of the male member. This means that substantial forces are needed to lock the coupling in the first place and to keep it locked under the necessary pressure. This design could leak even upon slight separation of the male and female coupling members, which is a problem because of the internal pressures when each hydraulic line is pressured up, as discussed above. The V-seal coupling requires a preload mechanism to prevent separation of the coupling members. Extremely close tolerances are required both for the couplings and manifold plates. In principal, the V-seal coupling was reusable and the coupling could be disengaged and reengaged more than once without replacing the seal. In practice, however, the V-seal would quite often flip out or flip sideways when the coupling was disconnected. If the coupling was reconnected without repositioning the V-seal, the coupler would be damaged beyond use.

In U.S. Pat. No. 4,694,859 to Robert E. Smith III, an undersea hydraulic coupling with a radial metal seal is disclosed. This coupling provides a reusable radial metal seal which engages the circumference of the probe when it is positioned within the female member body. The metal seal is held in place by a cylindrical body or retainer. The retainer prevents escape of the metal seal from the female member body. When the male and female portions of the coupling are parted under pressure, the retainer prevents the metal seal from blowing out through the bore of the female member. This coupling uses a pressure actuated C-ring seal. Among the advantages of this design are that it requires no preload mechanism, is tolerant to movement of the two halves of the coupling relative to one another, and allows greater tolerances between the couplings and the manifold plates. Rather than sealing with the leading face of the male member (as done by the V-seal coupling), this design uses a pressure energized C-seal for sealing with the outer circumference of the male member. The retainer also may be used to pre-load the C-seal by urging it radially inwardly to engage the circumference of the male member. This is accomplished by positioning the seal on a shoulder within the female member bore, then locking the retainer against the seal.

SUMMARY OF THE INVENTION

The present invention provides a coupling with a seal member having a flexible annular metal seal surface or lip extending therefrom. The seal surface is responsive to fluid pressure to be urged radially inward against the outer wall surface of the male member and forms a radial seal between the wall surface and seal member. The seal member is adapted to be engaged with the female member, with the metal seal surface extending into the female member bore.

Among the advantages of the present invention are that it provides a pressure-responsive metal seal with fewer separate components than in previous metal seal couplings.

BRIEF DESCRIPTION OF THE DRAWINGS

FIG. 1 is an exploded perspective view of one embodiment of the present invention including the male member, seal member, and female member body.

FIG. 2 is a section view of the male member.

FIG. 3 is a section view of the female member body with the seal member in place.

DETAILED DESCRIPTION OF A PREFERRED EMBODIMENT

Undersea hydraulic couplings are generally connected to opposing plates of a manifold and are held together by bolts or hydraulic members attached to the plates. The male and female members may be attached to the opposing plates using various means, such as set screws or threads. Techniques for attaching the members to such plates are well known to those skilled in the art.

FIG. 1 is an exploded perspective view of the coupling and seal member according to a preferred embodiment of the invention. As shown, the main components of the coupling are a male member or probe 10, a seal member 37, and a female member or receiver 50. Each of these members comprise components which will be more fully described below.

As shown in FIG. 1, in a preferred embodiment the male member or probe 10 comprises a handle 11 which may be threaded for attachment to a manifold plate. The handle terminates at flange 12 of the male member and tapered shoulder 20. The tapered shoulder 20 is tapered down to the first end of the cylindrical probe wall 13 which terminates at probe face 21. The cylinder probe wall 13 is adapted for sliding engagement with the seal member 37, as will be discussed below.

The body of the male member also is provided with a central bore 14. Bore 14 has several variations in its diameter as it extends through the body of the male member. In a preferred embodiment, the first end of the central bore comprises an internally threaded section 24 for connection to a hydraulic line. A cylindrical passageway 25 extends longitudinally within the male member body and terminates at valve seat 16 which is an inclined shoulder.

As shown in FIG. 2, a valve assembly 22 is slidably received within the central bore 14 of the male member. The valve assembly 22 comprises a conical poppet valve 15 which sealingly engages the valve seat 16 in its normally closed position. Helical valve spring 17 is used to urge the poppet valve into a closed position against the valve seat. The helical valve spring 17 is located within the cylindrical passageway 25 and anchored at spring collar 18 which is held in place by collar clip 23 inserted within the inner surface of the cylindrical passageway of the male member.

Female member or receiver 50 comprises a body having a receiving chamber or bore 78 for receiving the male member or probe 10, and a handle 69 which optionally may be threaded to a manifold plate (not shown). As shown in FIG. 3, the valve assembly 40 of the female member comprises a poppet valve 62 which is slidably received in the cylindrical passageway 74 of the female member 60. Poppet valve 62 is conical in shape and is urged by valve spring 64 into a seated position against the valve seat 63. When the poppet valve is in the closed position against the valve seat 63 as shown in FIG. 3, it seals fluid from flowing between the male member and female member. The hollow spring collar 65 anchors the valve spring 64 and is held in place by a collar clip 67. The valve assemblies 22 and 40 in the male and female members are positioned so that upon engagement of the male and female members, poppet valve 15 in the male member and poppet valve 62 in the female member will be forced off the seal seats 16 and 63.

The seal member 37 comprises a cylindrical body having a first end 38, a second end 39, an outer circumference 36, and an intermediate bore 41 extending therethrough. The second end 39 of the seal member is positionable to abut the outermost shoulder surface 32 in the female member bore. The female member bore also includes an intermediate shoulder surface 51, a riser 33 between the outermost shoulder 32 and intermediate shoulder 51, an innermost shoulder surface 52, and a riser 53 between the intermediate shoulder 51 and innermost shoulder 52.

Extending from the second end 39 of the seal member is an annular flexible metal seal surface or lip 45. When the seal member is engaged with the female member or receiver, this metal seal surface 45 extends over the outermost shoulder surface 32 and riser 33 of the female member. Between the seal surface 45 and the riser 33 is a cavity 46. Internal hydraulic pressure in cavity 46 urges the seal surface 45 against the probe wall 13 of the male member or probe. The annular flexible metal seal surface 45 is integral with seal member 37. The metal seal surface 45 is reusable so that the coupling may be repeatedly sealed and re-sealed. The metal seal surface 45 engages the male member when it is inserted therein and forms a radial metal to metal seal with the probe wall 13. The seal surface 45 may be gold plated, or other types of metal plating may be used to enhance the metal to metal seal. In a preferred embodiment, the metal seal surface 45 has an inner diameter slightly smaller than the diameter of the probe wall 13. This allows the seal to be "pre-loaded" prior to any fluid pressure in the coupling.

The seal member 37 also includes one or more soft seals, such as soft seal 47 for sealing with outer shoulder surface 32 of the female member. The soft seal 47 is positioned in a groove 48 in the second end 39 of the seal member. Additional soft seals may be used to seal between the seal member 37 and the bore 78 of the female member. A metal C-seal also may be used to seal between the seal member 37 and the bore 78 of the female member.

In a preferred embodiment, the seal member 37 is inserted in the receiving chamber or bore 78 of the female member and locked in position with clip 59. To lock the seal member in position, the clip 59 has an inner diameter smaller than the outer diameter 36 of the seal member. In an alternative embodiment, the seal member 37 is threaded to the female member bore. Alternatively, a two-piece seal member may be used, as shown in U.S. Pat. No. 4,900,071 to Robert E. Smith III. Other means may be used for locking the seal member 37 to the female member or receiver. For example, the seal member may be positioned externally of the female member receiving chamber and threaded to the outer circumference 79 of the female member. In such an arrangement, the seal surface 45 extends into the female bore.

Additional elastomeric seals may be used in the bore 41 of the seal member. For example, backup seal 80 is positioned in a groove 81 near the second end 38 of the seal member to seal with the probe wall surface 13.

As can be expected and as will be appreciated by one skilled in the art, the embodiment of the present invention described above may be modified in numerous ways without departing from the scope of the invention. For example, the seal member may be configured in other ways without affecting the operation of the seal surface of the present invention.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. A coupling comprising:
   a receiver having a first bore extending therethrough from a first end to a second end;
   a seal member having a second bore extending therethrough from a first end to a second end, the second end of the seal member having a flexible annular metal seal surface extending therefrom, the flexible annular metal seal surface being integral with the seal member, the seal member configured to be engaged with the first end of the receiver whereby the flexible annular metal seal surface extends into the first bore; and
   a probe having an outer wall surface, the probe adapted to slide within the second bore of the seal member, the flexible annular metal seal surface configured to seal radially with the outer wall surface of the probe, the flexible annular metal seal surface being responsive to fluid pressure in the coupling to be urged radially inward against the outer wall surface of the probe.

2. The coupling of claim 1 wherein the seal member is insertable into the first bore of the receiver.

3. The coupling of claim 1 wherein the seal member further comprises an annular groove in the second bore and an annular elastomeric seal insertable into the groove.

4. The coupling of claim 1 wherein the second end of the seal member further comprises an annular groove and an elastomeric seal insertable into the groove.

5. The coupling of claim 1 further comprising a first normally closed check valve in the first bore and a second normally closed check valve in the second bore.

6. A coupling comprising:
   a receiver having a longitudinal axis, a first end, a second end, and a first bore extending therethrough, the first bore having a stepped circumferential shoulder extending radially inward including an outermost shoulder surface, an intermediate shoulder surface, and an innermost shoulder surface, the three separate shoulder surfaces progressively farther spaced from the first end and closer to the longitudinal axis;
   a sleeve-like member adapted to be inserted into the first end of the first bore, the sleeve-like member having a first end and a second end, the first end of the sleeve-like member configured to abut the outermost shoulder surface and to extend internally over the intermediate shoulder surface, the sleeve-like member having a second bore extending therethrough, the second bore having a bore wall and a flexible annular metal seal integral with the bore wall and extending from the bore wall into the first bore of the receiver between the outermost shoulder surface and the intermediate shoulder surface;
   a probe having an outer circumferential surface, the probe adapted to be inserted through the second bore and into the first bore, the flexible annular metal seal configured to engage the outer circumferential surface of the probe as the probe is inserted through the second bore and into the first bore.

7. The coupling of claim 6 further comprising a clip engageable with the first bore for retaining the sleeve-like member in the first bore.

8. The coupling of claim 6 wherein the sleeve-like member is threadable to the first bore.

9. The coupling of claim 6 further comprising a first normally closed check valve in the first bore and a second normally closed check valve in the second bore.

10. An undersea hydraulic coupling comprising:
    a female member having a first end, a second end, and a first bore extending therethrough, the first bore having a shoulder intermediate the first and second end, and having a first normally closed check valve for sealing off fluid flow between the first end and second end;
    a male member having a first end, a second end, and a second bore extending therethrough, the second bore having a second normally closed check valve for sealing off fluid flow between the first end and second end, the first and second check valves opening upon insertion of the male member into the first bore;
    a seal member engageable with the first end of the female member, the seal member having a first end, a second end, a third bore extending therethrough, and a flexible metal annular lip extending from the second end of the seal member and into the first bore adjacent the shoulder, whereby the flexible metal annular lip sealingly engages the male member when the male member is inserted through the third bore and into the first bore, the flexible metal annular lip adapted to be urged radially inwardly against the male member when the first and second check valves are opened and the flexible metal annular lip is exposed to fluid pressure in the coupling.

11. The undersea hydraulic coupling of claim 10 wherein the shoulder comprises an outermost shoulder surface, an intermediate shoulder surface, and an innermost shoulder surface, the three separate shoulder surfaces progressively farther spaced from the first end and extending progressively inwardly.

12. The undersea hydraulic coupling of claim 10 wherein the seal member is insertable into the first bore.

13. The undersea hydraulic coupling of claim 11 wherein the first end of the seal member is positionable against the outermost shoulder surface.

14. The undersea hydraulic coupling of claim 13 further comprising an annular groove in the first end of the seal member, and an elastomeric seal positionable in the groove for sealing between the seal member and the outermost shoulder surface.

15. The undersea hydraulic coupling of claim 10 further comprising an elastomeric ring seal positionable in the third bore to seal between the seal member and the male member.

* * * * *